C. R. BUTLER.
ELECTRIC TESTING APPARATUS.
APPLICATION FILED FEB. 15, 1912.
1,046,148.
Patented Dec. 3, 1912.
2 SHEETS—SHEET 1.
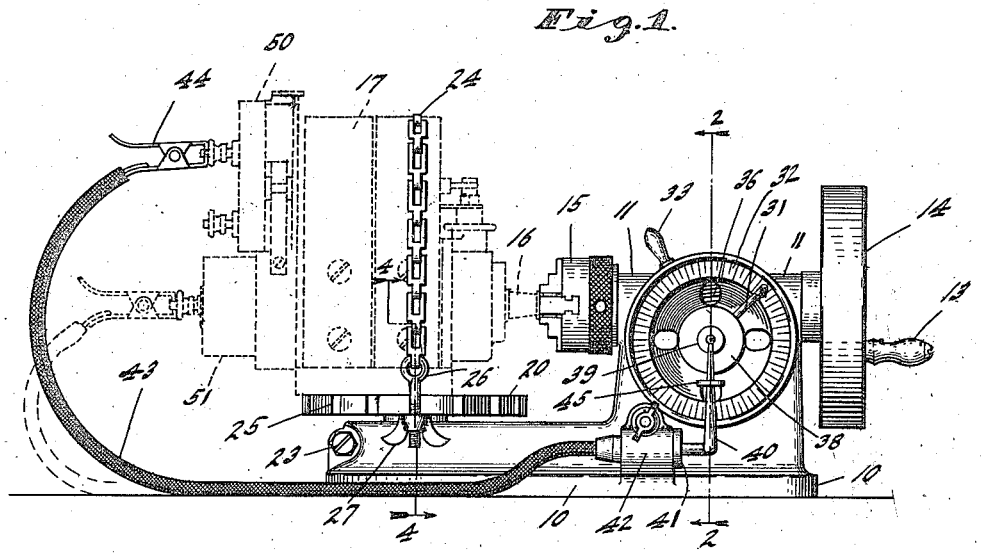
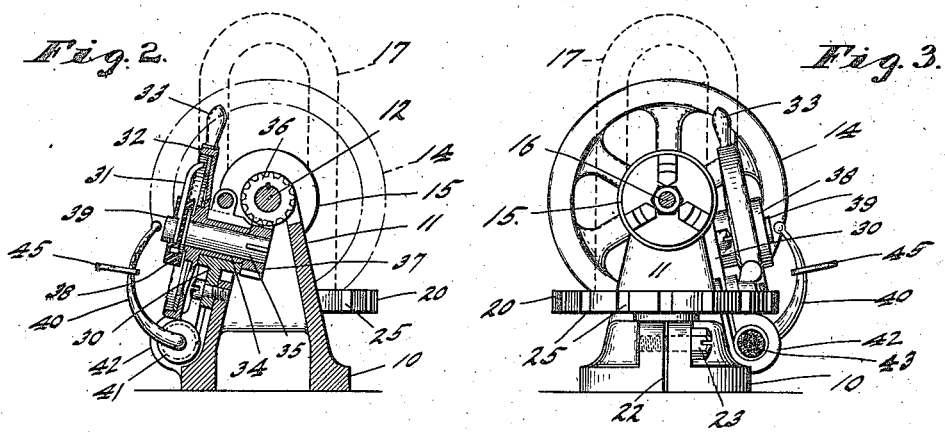
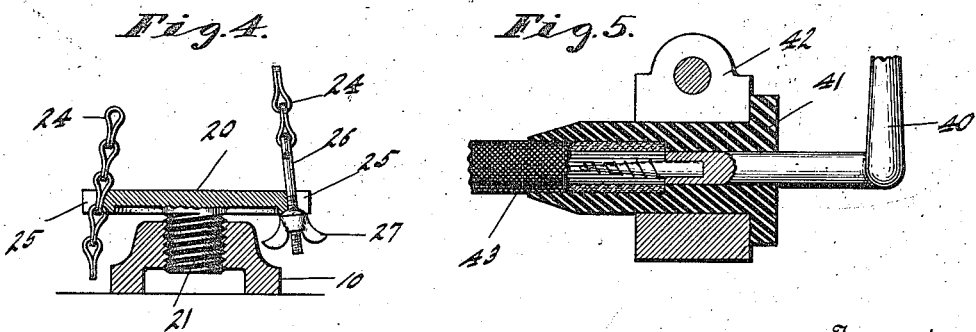
Witnesses
Inventor
Charles R. Butler,
By Arthur M. Hood
Attorney

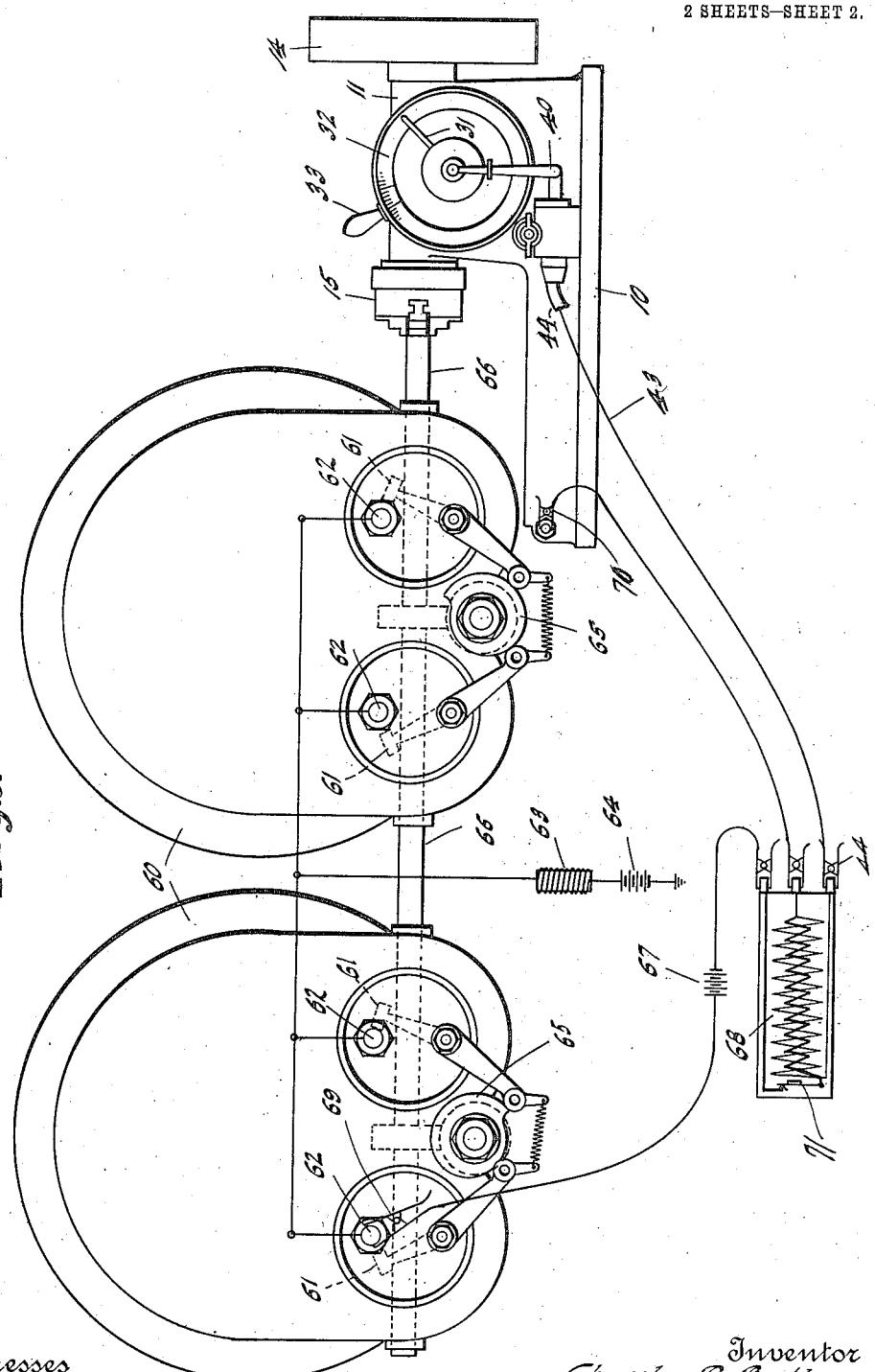

UNITED STATES PATENT OFFICE.

CHARLES R. BUTLER, OF CARTHAGE, INDIANA.

ELECTRIC TESTING APPARATUS.

1,046,148.  Specification of Letters Patent.  Patented Dec. 3, 1912.

Application filed February 15, 1912. Serial No. 677,822.

*To all whom it may concern:*

Be it known that I, CHARLES R. BUTLER, a citizen of the United States, residing at Carthage, in the county of Rush and State of Indiana, have invented a new and useful Electric Testing Apparatus, of which the following is a specification.

In the operation of electrical sparking apparatus, such as the ignition apparatus for internal combustion engines, it is of the utmost importance that the sparks occur exactly at the proper points and that the wiring system be free from grounds or leaks. Failure in these particulars, especially in automobile work, are productive of many troubles; which are not only hard to locate, but are often blamed on some other part of the equipment, most frequently on the carbureter.

It is the object of my present invention to provide for this kind of electrical apparatus a testing apparatus which is readily transportable, is easily operable, and, while working from the final results, indicates directly the character and approximate amount of the necessary remedy.

In attaining this object I provide a rotatable member which is preferably readily connectible to the shaft of a magneto or other apparatus, and two electrodes rotatable relatively to each other by such movable member. One of these electrodes, preferably the normally stationary one, is provided with some angle-indicating mechanism such as a protractor; and one of them is provided with a connecting device by means of which it can readily be connected, if desired through an adjustable spark gap, to desired points in the electric system to be tested. The testing apparatus is also preferably provided with an adjustable table, for supporting a magneto or other device in proper relation to the aforesaid rotatable member; and is so light and compact that it may be used for testing electrical apparatus, such as a magneto, without the necessity for disconnecting the latter, thus enabling the whole wiring system, as actually in use, to be tested.

The various novel features of my invention will appear from the description and drawings, and will be particularly pointed out in the claims.

In the drawings, Figure 1 is a front elevation of a testing apparatus embodying my invention, a magneto in proper position for test being indicated in dotted lines; Fig. 2 is a section on the line 2—2 of Fig. 1; Fig. 3 is an end elevation of the device shown in Fig. 1, looking from the left; Fig. 4 a section on line 4—4 of Fig. 1; Fig. 5 is an enlarged longitudinal section through the clamp and bushing for supporting the spark gap finger; and Fig. 6 shows my testing apparatus as used for testing the ignition of an internal combustion engine with make-and-break ignition.

The base 10 is provided at one end with a head-stock 11 supporting in its two spaced bearings a longitudinal shaft 12 provided with an operating handle 13, and preferably a flywheel 14, at its outer end, and with a chuck 15 or other suitable connecting mechanism at its inner end. By means of the chuck 15, the shaft 12 may be connected to a shaft 16 of a magneto 17 or other device to be tested. If the device to be tested has no shaft of its own for convenient attachment to the chuck 15, it may be mounted in any suitable manner on a special shaft provided for the purpose and clamped in the chuck 15. If desired, the connection between the shaft 12 and the device to be tested may be by gearing or its equivalent, and may be at any desired speed ratio.

For supporting magnetos or other devices while being tested, a table 20 is provided at the other end of the base 10 from the head stock 11. This table is preferably adjustable in height, as by having a threaded supporting stem 21 screwed into a socket near the end of the base 10, said socket being slotted at 22 so that by means of a screw 23 the stem 21 may be clamped, if desired, in adjusted position. However, it is frequently desirable not to tighten the screw 23 during a test, thus allowing the table to tilt slightly in case the shaft 16 of the supported magneto requires such tilting in order properly to aline with the shaft 12.

During test a magneto is preferably clamped to the table 20 by some suitable mechanism, the clamping mechanism now preferred comprising a chain 24 which can be passed over the magneto and hooked into opposite ones of a series of notches 25 in the periphery of the table 20. The chain can be tightened by means of a hook 26 engaging one of its ends and provided with a wing nut 27 engaging the under side of the table and the threaded end of the hook.

A frame 30, preferably removably attached to the front of the head-stock 11, supports the two electrodes 31 and 32. In the preferred arrangement, the electrode 32 comprises a protractor adjustable by a handle 33 and supported by a sleeve 34 journaled in the frame 30 and itself forming a bearing for the co-axial shaft 35 carrying the electrode 31. The shaft 35 is driven from the shaft 12 by any suitable gearing, preferably having a 1—1 gear ratio; in the arrangement shown this gearing comprises the two spiral gears 36 and 37. Though the shaft 35 carries the electrode 31, it is electrically insulated therefrom, as by a disk 38 of insulation fixed to the end of the shaft 35 and having the finger electrode 31 projecting from its periphery. The outer end of the finger electrode 31 moves over the protractor of the electrode 32, and is bent in toward such protractor, but not into engagement therewith. The inner end of the finger electrode is connected to a metal button 39 set in the face of the insulating disk 38 and coöperating with a spark gap finger 40 supported in an insulating bushing 41 in a clamp 42 on the base 10. The finger 40 is electrically connected, within the bushing 41, to one end of the cable 43, of which the other end is provided with a suitable spring clip 44 or other suitable, and preferably readily detachable, connecting device. The spark gap finger 40 is provided with an adjusting handle 45, preferably of insulating material; by means of this handle the distance between the end of the spark gap finger and the button 39 may be adjusted as desired.

Assume that a magneto 17 is in the position indicated in Fig. 1, and that the clip 44 is connected to some point on the electrical system, such as a terminal of the magneto or of the distributer 50 driven from the magneto. If now shaft 12, and consequently the magneto shaft 16, is operated by the handle 13, the sparks produced by the magneto will take place between the electrodes 31 and 32. Step-up transformers, or jump-spark induction coils, may be used when necessary to obtain the sparks, such coils being common in automobile work. As the electrode 31 is moving at the same angular speed as the shafts 12 and 16, the exact location of these sparks may be noted on the protractor of the electrode 32, this location being readable with surprising ease and accuracy although the finger electrode 31 is moving. Sparks being produced by most magnetos at every 180° of movement of the magneto armature, the sparks between the electrodes 31 and 32 should be 180° apart on the protractor if the clip 44 is connected to receive all the impulses from the magneto. For ease in reading, the stationary electrode 32 may be adjusted by the handle 33 to bring one of the sparks at zero reading. It usually occurs in commercial magnetos that the cams on the circuit breaker 51 of the magneto will not operate to produce sparks at exactly 180° apart. The error, if any, will be noted on the protractor, and from the error thus noted the cams may be adjusted, as by a few strokes of a slip stone or by raising them on paper shims, until the sparks occur on the protractor at exactly 180° apart.

If instead of a circuit-breaker on the shaft of a magneto there is a commutator driven at a suitable speed reduction from such shaft, the sparks produced when this commutation is driven at the speed of the shaft 12 may be spaced otherwise than 180° apart; as, for instance, 90° or 60° apart. In case the sparks are not exactly spaced, the proper parts of the commutator may be dressed down or otherwise adjusted to bring them into exact relation. The exact location of any error is indicated by moving the handle 13 until the finger electrode 31 is at the place where the improperly located spark occurred, at which time the cam of the circuit-breaker or the contact of the commutator will be in working position with its coöperating parts, and proper correction is directly indicated.

In case of grounds or leakage in the machine to be tested or its wiring system, indication to that effect will be given by the relative character of the different sparks produced on the protractor as well as by the elimination of some but not all of the sparks by a movement of the spark gap arm 40 away from the button 39. In testing the wiring, the clip 44 may be attached to various points of the wiring, or to the spark plug terminals of the different cylinders of the engine, and the location and character of the spark produced between the electrodes 31 and 32 noted.

Tests of the wiring system of an automobile may be made without in any way disturbing such wiring system, for the preferred form of my testing apparatus is quite light and readily portable, and may be placed upon the sill of the automobile and the magneto shifted the short distance necessary to move it from its normal place in the machine to the table 20. This shifting can be accomplished without changing the electrical connections of the magneto.

There are a number of uses to which my testing apparatus may be put other than the particular ones to which I have already called attention, these uses readily suggesting themselves to persons familiar with spark-producing apparatus. It is not deemed necessary to attempt to point out specifically all such uses; but as all those heretofore considered have related to high tension devices immediately capable of producing the spark between the electrodes of my testing apparatus, it may be of value to show its application to one form of low-tension apparatus.

Fig. 6 shows such an arrangement. Suppose it be desired definitely to determine the spark-producing action in a four cylinder internal combustion engine 60 provided with the so-called low-tension or make-and-break ignition system. The ignition spark is produced in each cylinder upon the separation of a movable contact 61 from a stationary insulated contact 62, these two contacts being in series with a self-induction or "single coil" spark coil 63 supplied from a battery 64 or other source of electro-motive force. The separation of the contacts 61 and 62 is effected in any usual manner, as by cams 65 driven from a cam shaft 66, which in four-cycle engines usually rotates at one-half the speed of the engine crank shaft. To test this system, my apparatus may be suitably mechanically connected to some rotating point of the engine, at any desired speed ratio. Usually the most convenient manner of connecting it is by cranking the chuck 15 directly on the cam shaft 66 as illustrated. Then a battery 67 and the primary of an induction coil 68 in series are connected to the ignition system in parallel with the battery 64 and spark coil 63, the connection being conveniently made by means of a clip 69 to one of the insulated contacts 62, and by a similar clip 70 to some grounded part of the engine or testing apparatus. This ground connection is common to both primary and secondary of the induction coil 68, the ungrounded side of the secondary being connected to the spark gap arm 40 by the cable 43 and the clip 44. The induction coil 68 serves as a step-up transformer to produce a tension sufficient to produce the desired spark for the testing apparatus.

If the induction coil 68 is a "non-vibrating" coil, the rotation of the engine will cause a spark to occur between the electrodes 31 and 32 at the moment of the separation of any pair of contacts 61 and 62 to produce a spark in one of the cylinders, and the relation between the sparks in the different cylinders may be determined by the direct reading on the protractor. If the coil 68 is a "vibrating" coil, the vibrator 71 thereof will produce a continual make-and-break of the primary circuit of such coil during the whole time any two coöperating contacts 61 and 62 are in engagement, and will cease upon the separation of such contacts. This also enables a direct reading to be obtained upon the protractor, but here the reading will be at the points where the sparks between the electrodes 31 and 32 cease. These tests do not interfere with the normal operation of the engine, and therefore may be made when the engine is being moved either by its own power or by external power.

Although I have described my invention as applied to testing ignition systems for internal combustion engines, it is equally applicable to the testing of many other systems. Moreover, it is capable of considerable modification from the preferred embodiment illustrated. I aim to cover all applications and modifications which do not involve a departure from the spirit and scope of my invention as set forth in the following claims.

What I claim as new is:

1. An electrical testing apparatus comprising a continuously rotatable member for mechanical connection to a rotatable device to be tested, an adjustable table for supporting the device to be tested in proper relation to the aforesaid rotatable member, a pair of coöperating electrodes insulated from each other and one rotatable relatively to the other by the movement of said rotatable member and at the same speed as the latter, and means for electrically connecting one of said electrodes to a desired point on the device to be tested.

2. An electrical testing apparatus comprising a continuously rotatable member for mechanical connection to a rotatable device to be tested, an adjustable table for supporting the device to be tested in proper relation to the aforesaid rotatable member, a pair of coöperating electrodes insulated from each other and one rotatable relatively to the other by the movement of said rotatable member, and means for electrically connecting one of said electrodes to a desired point on the device to be tested.

3. An electrical testing apparatus comprising a continuously rotatable member for mechanical connection to a rotatable device to be tested, a pair of coöperating electrodes insulated from each other and one rotatable relatively to the other by the movement of said rotatable member and at the same speed as the latter, and means for electrically connecting one of said electrodes to a desired point on the device to be tested.

4. An electrical testing apparatus comprising a continuously rotatable member for mechanical connection to a rotatable device to be tested, a pair of coöperating electrodes insulated from each other and one rotatable relatively to the other by the movement of said rotatable member, and means for electrically connecting one of said electrodes to a desired point on the device to be tested.

5. An electrical testing apparatus, comprising a rotatable shaft provided with means for drivingly connecting it to a rotatable electric device to be tested, a table vertically adjustable to support the device to be tested in proper relation to such shaft, means for clamping the device to be tested to said table, a pair of electrodes insulated from each other, one of said electrodes having the form of a protractor and the other that of a finger movable over said protractor at a slight distance therefrom, means for rotating one of said electrodes relatively to the other by the movement of the shaft and at the speed thereof, means for adjusting said electrodes angularly relatively to each other without movement of said shaft, and means for electrically connecting one of said electrodes to a desired point on the apparatus to be tested.

6. An electrical testing apparatus, comprising a rotatable shaft provided with means for drivingly connecting it to a rotatable electric device to be tested, a table vertically adjustable to support the device to be tested in proper relation to such shaft, a pair of electrodes insulated from each other, one of said electrodes having the form of a protractor and the other that of a finger movable over said protractor at a slight distance therefrom, means for rotating one of said electrodes relatively to the other by the movement of the shaft and at the speed thereof, means for adjusting said electrodes angularly relatively to each other without movement of said shaft, and means for electrically connecting one of said electrodes to a desired point on the apparatus to be tested.

7. An electrical testing apparatus, comprising a rotatable shaft provided with means for drivingly connecting it to a rotatable electric device to be tested, a pair of electrodes insulated from each other, one of said electrodes having the form of a protractor and the other that of a finger movable over said protractor at a slight distance therefrom, means for rotating one of said electrodes relatively to the other by the movement of the shaft and at the speed thereof, means for adjusting said electrodes angularly relatively to each other without movement of said shaft, and means for electrically connecting one of said electrodes to a desired point on the apparatus to be tested.

8. An electrical testing apparatus, comprising a rotatable shaft provided with means for drivingly connecting it to a rotatable electric device to be tested, a table vertically adjustable to support the device to be tested in proper relation to such shaft, means for clamping the device to be tested to said table, a pair of electrodes insulated from each other, one of said electrodes having the form of a protractor and the other that of a finger movable over said protractor at a slight distance therefrom, means for rotating one of said electrodes relatively to the other by the movement of the shaft, means for adjusting said electrodes angularly relatively to each other without movement of said shaft, and means for electrically connecting one of said electrodes to a desired point on the apparatus to be tested.

9. An electrical testing apparatus, comprising a rotatable shaft provided with means for drivingly connecting it to a rotatable electric device to be tested, a table vertically adjustable to support the device to be tested in proper relation to such shaft, a pair of electrodes insulated from each other, one of said electrodes having the form of a protractor and the other that of a finger movable over said protractor at a slight distance therefrom, means for rotating one of said electrodes relatively to the other by the movement of the shaft, means for adjusting said electrodes angularly relatively to each other without movement of said shaft, and means for electrically connecting one of said electrodes to a desired point on the apparatus to be tested.

10. An electrical testing apparatus, comprising a rotatable shaft provided with means for drivingly connecting it to a rotatable electric device to be tested, a pair of electrodes insulated from each other, one of said electrodes having the form of a protractor and the other that of a finger movable over said protractor at a slight distance therefrom, means for rotating one of said electrodes relatively to the other by the movement of the shaft, means for adjusting said electrodes angularly relatively to each other without movement of said shaft, and means for electrically connecting one of said electrodes to a desired point on the apparatus to be tested.

11. An electrical testing apparatus, comprising a rotatable shaft provided with means for drivingly connecting it to a rotatable electric device to be tested, a table vertically adjustable to support the device to be tested in proper relation to such shaft, means for clamping the device to be tested to said table, a pair of electrodes insulated from each other, one of said electrodes having the form of a protractor and the other that of a finger movable over said protractor at a slight distance therefrom, means for rotating one of said electrodes relatively to the other by the movement of the shaft and at the speed thereof, and means for electrically connecting one of said electrodes to a desired point on the apparatus to be tested.

12. An electrical testing apparatus, comprising a rotatable shaft provided with means for drivingly connecting it to a rotatable electric device to be tested, a table vertically adjustable to support the device to be tested in proper relation to such shaft, a pair of electrodes insulated from each other, one of said electrodes having the form of a protractor and the other that of a finger movable over said protractor at a slight distance therefrom, means for rotating one of said electrodes relatively to the other by the movement of the shaft and at the speed thereof, and means for electrically connecting one of said electrodes to a desired point on the apparatus to be tested.

13. An electrical testing apparatus, comprising a rotatable shaft provided with means for drivingly connecting it to a rotatable electric device to be tested, a pair of electrodes insulated from each other, one of said electrodes having the form of a protractor and the other that of a finger movable over said protractor at a slight distance therefrom, means for rotating one of said electrodes relatively to the other by the movement of the shaft and at the speed thereof, and means for electrically connecting one of said electrodes to a desired point on the apparatus to be tested.

14. An electrical testing apparatus, comprising a rotatable shaft provided with means for drivingly connecting it to a rotatable electric device to be tested, a table vertically adjustable to support the device to be tested in proper relation to such shaft, means for clamping the device to be tested to said table, a pair of electrodes insulated from each other, one of said electrodes having the form of a protractor and the other that of a finger movable over said protractor at a slight distance therefrom, means for rotating one of said electrodes relatively to the other by the movement of the shaft, and means for electrically connecting one of said electrodes to a desired point on the apparatus to be tested.

15. An electrical testing apparatus, comprising a rotatable shaft provided with means for drivingly connecting it to a rotatable electric device to be tested, a table vertically adjustable to support the device to be tested in proper relation to such shaft, a pair of electrodes insulated from each other, one of said electrodes having the form of a protractor and the other that of a finger movable over said protractor at a slight distance therefrom, means for rotating one of said electrodes relatively to the other by the movement of the shaft, and means for electrically connecting one of said electrodes to a desired point on the apparatus to be tested.

16. An electrical testing apparatus, comprising a rotatable shaft provided with means for drivingly connecting it to a rotatable electric device to be tested, a pair of electrodes insulated from each other, one of said electrodes having the form of a protractor and the other that of a finger movable over said protractor at a slight distance therefrom, means for rotating one of said electrodes relatively to the other by the movement of the shaft, and means for electrically connecting one of said electrodes to a desired point on the apparatus to be tested.

17. An electrical testing apparatus, comprising a rotatable shaft provided with means for drivingly connecting it to a rotatable electric device to be tested, a pair of electrodes insulated from each other, one of said electrodes having the form of a protractor and the other that of a finger movable over said protractor at a slight distance therefrom, means for rotating one of said electrodes relatively to the other by the movement of the shaft, an arm insulated from and movable relatively to one of said electrodes to form a spark gap between it and such electrode, and means for connecting said arm to a desired point on the device to be tested.

CHARLES R. BUTLER. [L. S.]

Witnesses:
 G. B. SCHLEY,
 FRANK A. FAHLE.